United States Patent [19]

Walter et al.

[11] Patent Number: 4,853,607
[45] Date of Patent: Aug. 1, 1989

[54] NON-ISOLATED THERMALLY RESPONSIVE BATTERY CHARGER

[75] Inventors: Richard T. Walter; Pradeep Bhagwat; George W. Lipa, all of Baltimore, Md.

[73] Assignee: Black & Decker Inc., Newark, Del.

[21] Appl. No.: 111,337

[22] Filed: Oct. 22, 1987

Related U.S. Application Data

[63] Continuation of Ser. No. 912,086, Sep. 29, 1986.

[51] Int. Cl.$^4$ .............................................. H02J 7/04
[52] U.S. Cl. ........................................ 320/36; 320/22
[58] Field of Search ..................... 320/22, 23, 35, 36

[56] References Cited

U.S. PATENT DOCUMENTS

| | | |
|---|---|---|
| Re. 28,656 | 12/1975 | Crowley et al. |
| 2,022,874 | 12/1935 | West |
| 2,562,234 | 8/1951 | Godshalk et al. |
| 2,802,980 | 8/1957 | Lapuyade |
| 3,113,255 | 12/1963 | Eberts |
| 3,320,508 | 5/1967 | Bradshaw et al. |
| 3,344,899 | 10/1967 | Wang et al. |
| 3,465,230 | 9/1969 | Ball |
| 3,539,898 | 11/1970 | Tolmie |
| 3,555,395 | 1/1971 | Berry |
| 3,568,038 | 3/1971 | Enders et al. |
| 3,746,961 | 7/1973 | Dobie |
| 3,766,437 | 10/1973 | Fritts |
| 3,790,810 | 2/1974 | Rogers et al. |
| 3,900,783 | 8/1975 | Herzog et al. ...................... 320/35 |
| 3,928,792 | 12/1975 | Mullersman et al. |
| 3,935,525 | 1/1976 | Elson et al. |
| 4,045,720 | 8/1977 | Alexandres |
| 4,297,630 | 10/1981 | Mullersman |
| 4,321,523 | 3/1982 | Hammel |
| 4,376,263 | 3/1983 | Pittroff et al. |
| 4,386,308 | 5/1983 | Emile, Jr. et al. |
| 4,398,139 | 8/1983 | Prinsze |
| 4,672,289 | 6/1987 | Ghosh et al. |
| 4,672,290 | 6/1987 | Ghosh et al. |

FOREIGN PATENT DOCUMENTS 624043 5/1949 United Kingdom .
1354491 5/1974 United Kingdom .

OTHER PUBLICATIONS

Electronics, Jan. 22, 1968, pp. 97-100, "There's No Overcharge for Fast-Charged Batteries", by James V. Ball.
Application Engineering Handbook, Supplement, General Electric Company, pp. 2-11, thru 2-13, Copyright 1973.

Primary Examiner—Patrick R. Salce
Assistant Examiner—Anita M. Ault
Attorney, Agent, or Firm—J. Bruce Hoofnagle; Edward D. Murphy; Harold Weinstein

[57] ABSTRACT

A non-isolated battery charger for direct connection to an AC source provides rectified DC current to the battery being charged. A thermostat in a heat conducting relationship with the battery senses battery temperature and discontinues the charging current when the temperature of the battery rises after attaining full charge. In one form of the invention, a trickle charge path is provided to the battery to maintain its charge state after the full charge has been attained. The trickle charge path is provided by an impedance shunting the thermostat and is operative as a current path when the thermostat is in its open condition. The trickle charge path can be a resistor where the thermostat is in the DC part of the charger circuit or a capacitor where the thermostat is in the AC part of the charge circuit. In another form of the invention, a latching function is performed by a pair of thermostats so that the charger circuit is 'latched' into is trickle charge operating state after the attainment of a full charge condition to prevent undesired cycling of the charge current between the full charge and trickle charge conditions. A switching circuit is provided by which the charging current and energy stored in the battery can be provided to a load so that the charger circuit can function as a supplemental power supply as well as a battery charger.

13 Claims, 3 Drawing Sheets

NON-ISOLATED THERMALLY RESPONSIVE BATTERY CHARGER

This application is a continuation of application Ser. No. 912,086, filed Sept. 29, 1986.

BACKGROUND OF THE INVENTION

The present invention relates to battery chargers and, more particularly, to battery chargers that are physically compact, inexpensive to fabricate, and well suited for charging batteries used in battery-powered consumer products.

Various types of circuits have been developed for charging batteries, typically nickel—cadmium (Ni—Cd) batteries, used in battery-powered consumer products such as small appliances and portable, hand-held power tools. In general, the charging circuit must be relatively simple in design and inexpensive to fabricate since complexity and high cost are inconsistent with the need to provide low-cost products to the consumer market. Where the battery charger circuit is integrated with the product, for example, a hand-held, battery-powered electric drill having a built-in charger circuit, it is important that the circuit be physically compact and lightweight to allow maximum design flexibility in configuring the final product.

In designing a battery charger circuit, consideration must be given to the rate of charging and the risk of overcharging, since repeated overcharging shortens the useful life of the battery. In the past, low-current charging circuits, known as 'trickle' chargers, have been used to charge the battery by supplying a relatively low current over a long period of time, e.g., 8-16 hours. The current level is usually low enough so that overcharging will not occur, even if the charging current is continued for an indefinite period. While low-current battery chargers avoid the problem of overcharging, their long charging cycles are not acceptable from the consumer standpoint. While higher current battery chargers, viz., the 'fast' chargers, can bring a battery to a full charge in an hour or so, the risk of overcharging the battery is dramatically increased in comparison to low-current chargers. As can be appreciated, a optimal battery charger would effect charging in a relatively short time, as in the case of the fast charger, and would minimize the probability of overcharging the battery, as in the case of the trickle charger.

Since battery-powered products operate at relatively low voltages, charger circuits have included step-down transformers that step the power source voltage, typically 120 VAC, down to a level consistent with requirements of the battery, e.g., 12 volts, and, additionally, 'isolate' the low voltage portions of the charger circuit from the higher voltage power source. Unfortunately, transformers are relatively expensive, and, where the charger circuit is to be integrated into the product housing, represent a component that is physically larger and heavier than the other circuit components typically used in charging circuits. Thus, in a battery charging circuit designed for use in consumer products, especially where the charger circuit must be integrated into the product housing, it is desirable that the transformer be eliminated for cost and design considerations.

SUMMARY OF THE INVENTION

In view of the above, it is an object of the present invention, among others, to provide a battery charger that is inexpensive to fabricate and which is well suited for use with battery powered products and the like.

It is another object of the present invention to provide a battery charger that determines when the battery undergoing charging has attained a full charge and then terminates the full charge current.

It is another object of the present invention to provide a battery charger that switches from a full charge mode to a maintenance charge mode after the battery undergoing charging has attained a full charge.

It is still another object of the present invention to provide a battery charger that switches from a full charge mode to a non-full charge mode when the battery undergoing charging attains a full charge and which remains in the non-full charge mode.

It is a further object of the present invention to provide a battery charger that will charge a battery in a fast and efficient manner without overcharging.

It is still further object of the present invention to provide a battery charger that can be utilized for charging a battery associated with a consumer product and, additionally, be utilized to supplement the power provided by the battery when the consumer product is operated.

In accordance with these objects, and others, the present invention provides a non-isolated battery charger that is powered by direct connection to an AC source and which provides rectified DC current to the battery being charged. A capacitive impedance in the AC path serves to limit the charge current to a constant, maximum value, and a thermostat in a heat conducting relationship with the battery senses battery temperature and discontinues the charging current when the temperature of the battery rises after attaining full charge. In one form of the invention, a trickle charge path is provided to the battery to maintain its charge state after the full charge has been attained. The trickle charge path is provided by an impedance shunting the thermostat and is operative as a current path when the thermostat is in its open condition. The trickle charge path can be a resistor where the thermostat is in the DC part of the charger circuit or a capacitor where the thermostat is in the AC part of the charge circuit. In another form of the invention, a latching function is performed by a pair of thermostats so that the charger circuit is 'latched' into its trickle charge operating state after the attainment of a full charge condition to prevent undesired cycling of the charge current between full charge and trickle charge conditions.

The present invention advantageously provides a battery charger that is inexpensive to fabricate because of its non-isolated configuration and yet provides for the fast and efficient charging of batteries including both full charge and trickle charge operating states and which also provides a latching feature by which the charging circuit is latched into the trickle charge operating state after the attainment of a full charge.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1A:
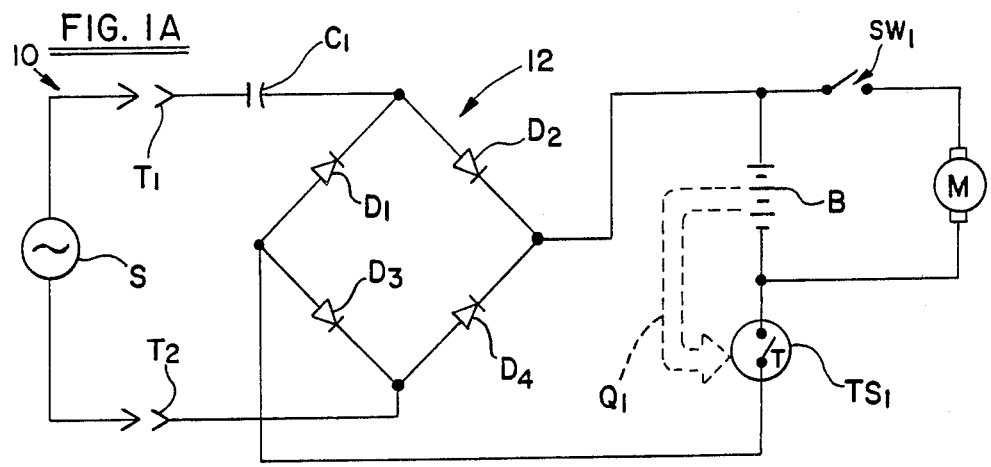
FIG. 1A is a schematic diagram of a non-isolated thermally responsive battery charger.

A non-isolated thermally responsive battery charger in accordance with the present invention is shown in general form in FIG. 1A and designated therein by the reference character 10. As shown, the battery charger 10 includes an input capacitive impedance, provided by capacitor $C_1$, a diode bridge rectifier 12, a battery B to be charged, and a thermostat $TS_1$. Alternating electric current (AC) is provided directly to the diode bridge 12 from a power source S through input terminals $T_1$ and $T_2$ with the terminal $T_1$ connected to the diode bridge 12 through the serially connected capacitor $C_1$. The diode bridge 12 is of conventional construction and includes diodes $D_1$, $D_2$, $D_3$, and $D_4$ with the N and P terminals of the diodes $D_1$ and $D_2$ connected to the capacitor $C_1$ and the N and P terminals of diodes $D_3$ and $D_4$ connected to the input terminal $T_2$. The diode bridge 12 accepts the AC input current and provides a rectified DC current for charging the battery B. The battery B and the thermostat $TS_1$ are serially connected with the positive terminal of the battery B connected to the N terminals of the diodes $D_2$ and $D_4$ and the thermostat $TS_1$ connected to the P terminals of the diodes $D_1$ and $D_3$. An electrically driven load, as exemplified by the motor M, is serially connected to the battery B through an ON-OFF, switch $SW_1$ of the single-throw, single-pole type. As represented by the heat conduction path $Q_1$ (dotted line illustration), the thermostat $TS_1$ is in thermal communication with the battery B and responds to the battery B temperature as described below. Thermal communication may be accomplished, for example, by mounting the thermostat $TS_1$ adjacent to or in contact with the battery B while the battery B is undergoing charging. The thermostat $TS_1$ is of the 'latch-open' type, that is, once the thermostat $TS_1$ is opened, it remains open until it is manually reset by the user, for example, by depressing a reset button.

In order to effect charging of a battery B, the terminals $T_1$ and $T_2$ are connected to an alternating current power source S, typically 120 VAC. The capacitor $C_1$ functions as a capacitive impedance (typically 30 microfarads) that limits the AC current flow and the maximum charging current applied to the battery B to a constant predetermined level sufficient to effect a fast charge of the battery B, a 1.2 amp current being representative for 12 volt batteries. The diode bridge 12 operates to provide a succession of positive alternations to the positive side of the battery B which, depending upon its type, converts the electrical energy via a chemical reaction to effect energy storage. The battery B will continue to accept the charge energy until it is fully charged at which point continued application of the charging energy will cause the battery to heat and its temperature to rise. The heat energy is conveyed to the thermostat $TS_1$ along thermal path $Q_1$ with the thermostat $TS_1$ opening when the temperature of the battery rises above a preselected threshold, for example, 45°-50° C., to interrupt the charging process. The thermostat $TS_1$ will latch into is open position and remain open until it is manually reset by the user.

Figure 1B:
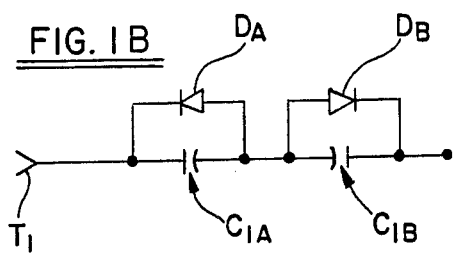
FIG. 1B is a partial schematic diagram representing an alternate capacitive impedance for the battery char circuit of FIG. 1A.

While a single capacitor $C_1$ of the film type is preferred for providing the capacitive impedance between the power source S and the diode bridge 12, a multi-capacitor arrangement, as illustrated in FIG. 1B is also suitable. As shown, first and second electrolytic capacitors $C_{1A}$ and $C_{1B}$ are serially connected between the terminal $T_1$ and the diode bridge 12 with the negative side of the two capacitors $C_{1A}$ and $C_{1B}$ connected together. Diodes $D_A$ and $D_B$ are connected across the capacitors $C_{1A}$ and $C_{1B}$, respectively, with the N side of each diode connected to the P side of its respective capacitor. When the terminal $T_1$ is positive, the diode $D_B$ provides a conduction path around capacitor $C_{1B}$ and, conversely, when the terminal $T_1$ is negative, the diode $D_A$ provides a conduction path around capacitor $C_{1A}$ with each capacitor being charged during the same alternations of successive waveforms. In order to achieve a 30 microfarads equivalent capacitive impedance, the serially connected capacitors $C_{1A}$ and $C_{1B}$ should be 60 microfarads each. The use of electrolytic capacitors results in a physically compact device that has the ability to support full voltage in both current directions.

The above-described circuit 10 provides a constant charging current to the battery B with the current interrupted by the thermostat $TS_1$ upon attainment of a sufficiently full charge to cause the battery B to control the thermostat $TS_1$ to interrupt the charging current with the thermostat $TS_1$ remaining in its latched-open state until reset by the user.

Figure 1C:
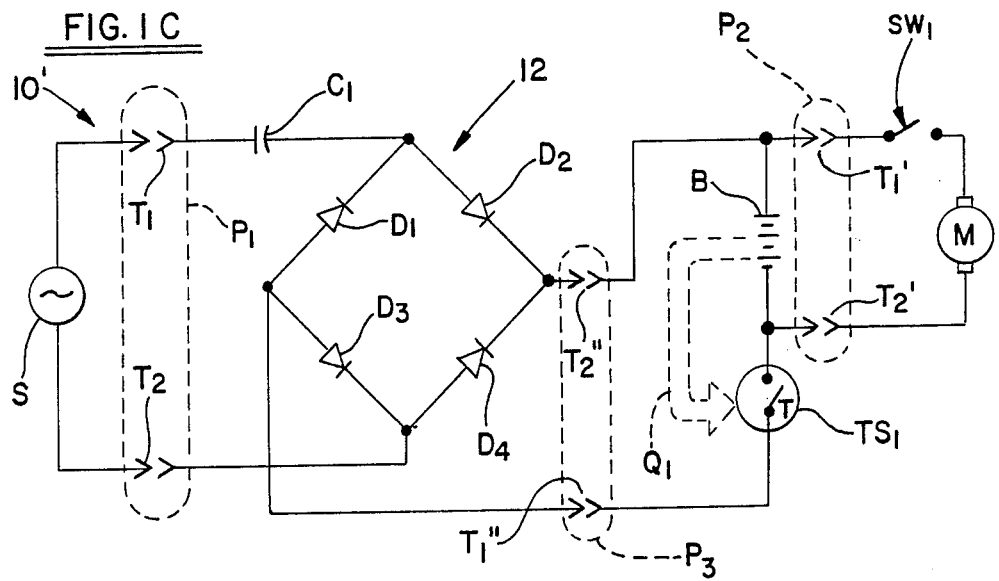
FIG. 1C is a variation of the non-isolated thermally responsive battery charger of FIG. 1A showing various connection interfaces by which the charger circuit can be wholly or partly incorporated into a consumer product, or packaged as a separate component.

The battery charger circuit 10 in FIG. 1A, as well as those described below, can be packaged in various configurations, depending upon the product design. For example and as shown in FIG. 1C the terminals $T_1$ and $T_2$ of the circuit 10' can be considered as a connection interface $P_1$ (symbolically represented in dotted line illustration) with all the components to the right of the connection interface $P_1$ mounted in the product housing. In the alternative, another connection interface $P_2$, which includes terminals $T_1'$ and $T_2'$ can be provided between the battery B, the switch $SW_1$, and the motor M. In this latter situation, the principal circuit components are contained in a housing (not specifically shown) that is separate from the product and connected to the product via the connection interface $P_2$. Lastly, a connection interface can be provided in another part of the battery charger circuit. For example, a connection interface $P_3$ having terminals $T_1''$ and $T_2''$ can be provided between the diode bridge 12 and the battery charging path, which includes the battery B and the thermostat $TS_1$. In this last situation, the diode bridge 12 is contained in a separate housing and connected to the product via the connection interface $P_3$. As can be appreciated, considerable latitude is available to the product designer as to packaging all the circuit components of the charger in the product or a portion of the circuit components in the product and the remainder in a separate housing that can be conveniently attached to the product by the user to effect charging.

Figure 2:
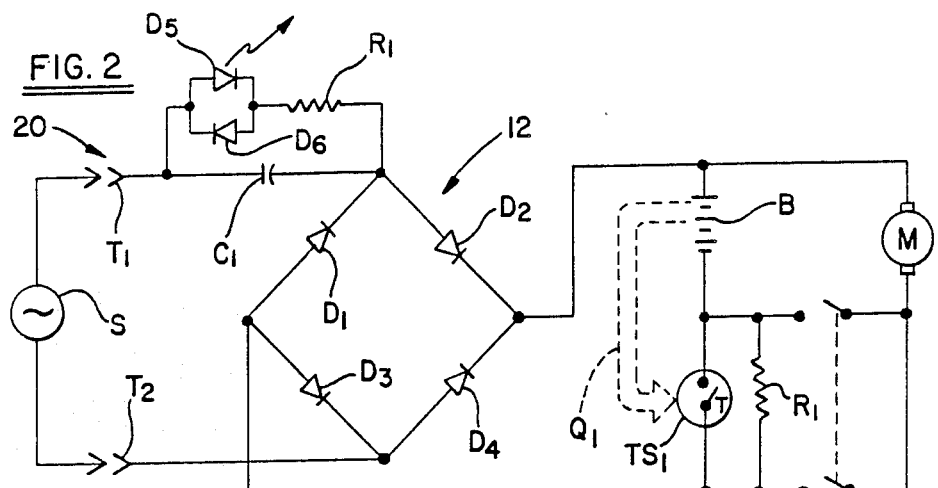
FIG. 2 is a schematic diagram of a battery charger circuit that provides a charging current at a first level and a second charging current at a second, maintenance or 'trickle' charge level.

A battery charger which provides a first charging current and a second maintenance or 'trickle' charge current and which uses both the energy stored in the battery and the energy available from the charger circuit to power the load is shown in FIG. 2 and designated generally therein by the reference character 20. In FIG. 2, components in common with those described in FIG. 1A are designated by the same reference characters. As shown in FIG. 2, input AC power is provided through terminals $T_1$ and $T_2$ to the diode bridge 12 with the output of the diode bridge 12 provided to the serially connected battery B and the thermostat $TS_1$. A resistor $R_t$ is connected in shunt circuit across the thermostat $TS_1$, and an ON-OFF switch $SW_2$ is connected across the thermostat $TS_1$ and is in series circuit with the motor M. As shown, the switch $SW_2$ is of the double-pole, single-throw type with both poles connected to the motor M, one contact connected between the thermostat $TS_1$ and the battery B, and the other contact connected to the other side of the thermostat $TS_1$. A circuit for indicating the operating state of the battery charger 20 and for discharging the capacitor $C_1$ is indicated generally at 14 and includes back-to-back parallel connected diodes $D_5$ and $D_6$ in series with a resistor $R_1$ with the diode-resistor circuit in parallel with the capacitor $C_1$. As explained below, the diode $D_5$ is a light-emitting diode (LED) and serves to indicate when the battery charger 20 is supplying the maximum charging current to the battery B, as distinguished from the maintenance or 'trickle' current. As in the case of the embodiment of FIG. 1A, thermostat $TS_1$ is in thermal communication with the battery B along heat conduction path $Q_1$ and is of the latch-open type.

The battery charger 20 operates in a manner similar to that of FIG. 1A to effect battery charging, that is, positive alternations are provided from the diode bridge 12 to the battery B until a full charge is attained after which the temperature of the battery B increases to open the thermostat $TS_1$ and interrupt the charging current. When the thermostat $TS_1$ is opened, a 'trickle' current is provided through resistor $R_t$ to maintain the charge level of the battery B thus insuring a full charge. In general, the 'trickle' current level provided through the resistor $R_1$ is sufficient to prevent self-discharge of the battery B, a 22 Kohms resistor $R_t$ providing a 5–10 milliamperes trickle current in the case of the preferred embodiment.

The double-pole, single-throw switch $SW_2$ allows both the energy stored in the battery B as well as the charging current to power the motor M or other load. When the battery charger 20 is disconnected from the power source S and the switch $SW_2$ is actuated to its closed position, the circuit from the battery B to the motor M is closed to power the motor M. Conversely, when the battery charger 20 is connected to the power source S and the switch $SW_2$ is closed, the circuit from the battery B to the motor M is closed, and, additionally, the circuit from the battery B to the current supplying diode bridge 12 is likewise closed so that electrical energy from the battery B as well as the diode bridge 12 is provided to the motor M. In this latter situation, about 85% of the electrical energy is provided from the battery B and the remaining 15% from the diode bridge 12. As can be appreciated, the battery charger 20 of FIG. 2, when connected to the power source S, functions as both a battery charger for the battery B and a supplemental power supply for the motor M.

The indicator/discharge circuit 14 shunting the capacitor $C_1$ functions to indicate when the battery charger 20 is in its full charge mode, that is, when the thermostat $TS_1$ is closed, and to discharge any residual energy stored in the capacitor $C_1$ when the battery charger 20 is disconnected from the power source S. When the thermostat $TS_1$ is closed and the full charge current is provided to the battery B, the impedance of the capacitor $C_1$ is such that the voltage drop across the capacitor $C_1$ is sufficient to bias the LED diode $D_5$ into conduction during those periods when the terminal $T_1$ is positive to thus indicate to the user that the battery B is being subjected to the full charge current. Conversely, when the battery B is fully charged and the thermostat $TS_1$ is opened, the current through the battery B is reduced to the trickle current supplied through the resistor $R_t$ and, accordingly, the voltage drop across the capacitor $C_1$ is insufficient to bias the LED diode $D_5$ into conduction and thus serves to indicate the conclusion of the full charge period to the user.

When the battery charger 20 is disconnected from the power source S, the capacitor $C_1$ will retain a residual charge with the terminal $T_1$ being either positive or negative, depending upon the moment in the AC waveform that the disconnection was effected. Where the terminal $T_1$ is positive at the moment of disconnection, the capacitor $C_1$ will discharge through the diode $D_5$ and the resistor $R_1$, and, conversely, where the terminal $T_1$ is negative at the moment of disconnection, the capacitor $C_1$ will discharge through the resistor $R_1$ and the diode $D_6$. In general, a resistor $R_1$ having a value of 22 Kohms is sufficient for the discharge function.

The battery charger 20 of FIG. 2 thus provides for both the full charging and maintenance charging of the battery B, an indication of full charging, a switching arrangement by which both the battery B and the charging current can be used to power the load, and a circuit for discharging the capacitive impedance after the battery charger is disconnected from the power source S.

Figure 3A:
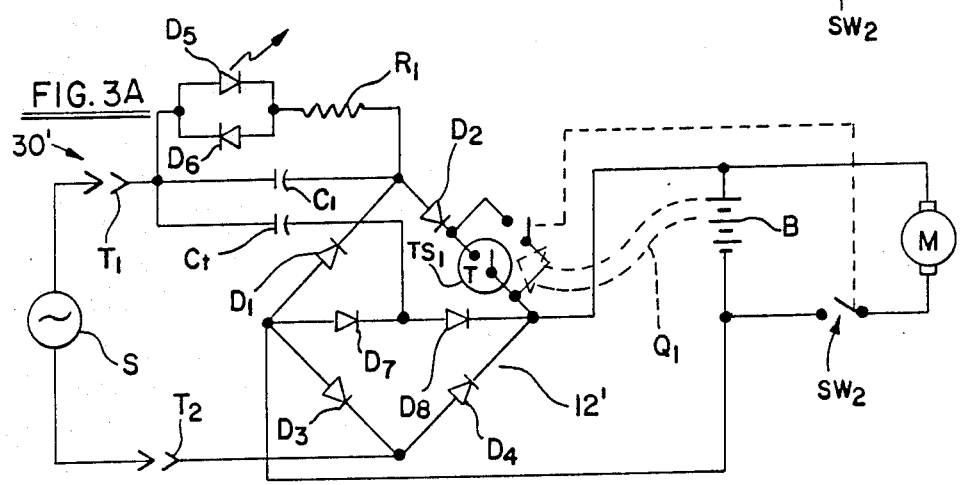
FIG. 3A is a schematic diagram of a variation of battery charger circuit of FIG. 2 for providing first and second levels of charging current.

A variation of the battery charger 20 of FIG. 2 is shown in FIG. 3A and designated therein generally by the reference character 30. As shown in FIG. 3A the resistor $R_t$ has been omitted while a capacitor $C_t$ is connected to terminal $T_1$ and two additional bridge diodes $D_7$ and $D_8$ to provide a modified diode bridge 12'. The diodes $D_7$ and $D_8$ are supplied through the capacitor $C_t$ and function in a manner analogous to the diodes $D_1$ and $D_2$ connected to the capacitor $C_1$. The capacitor $C_t$ has a capacitance of about 10% of that of the capacitor $C_1$, that is, about 3 microfarads in the case of the preferred embodiment. Additionally, the battery B is connected directly across the output of the diode bridge 12' and the thermostat $TS_1$ is connected in series with the diode $D_2$ with one pole of the switch $SW_2$ connected across the thermostat $TS_1$. When the battery B is undergoing charging, both the capacitor $C_1$ and the capacitor $C_t$ function as capacitive impedances to pass a full charge current from the diode bridge 12′ to the battery B. As the battery B attains full charge, the thermostat $TS_1$ opens to interrupt the charging current provided by capacitor $C_1$ through diode $D_2$. When the thermostat $TS_1$ is in its latched-open state, a much lower trickle charge current is provided through capacitor $C_t$ and the diode $D_8$ to the battery B to maintain the full charge condition of the battery B. When the switch $SW_2$ is closed by the operator, the thermostat $TS_1$ is shunted to again allow current to pass via capacitor $C_1$ and the diode $D_2$ to the battery B to supplement the power provided from the battery B as described above. The battery charger 30 of FIG. 3A thus achieves the same function as that of FIG. 2 without the need for the resistor $R_t$ shunting the thermostat $TS_1$.

Figure 3B:
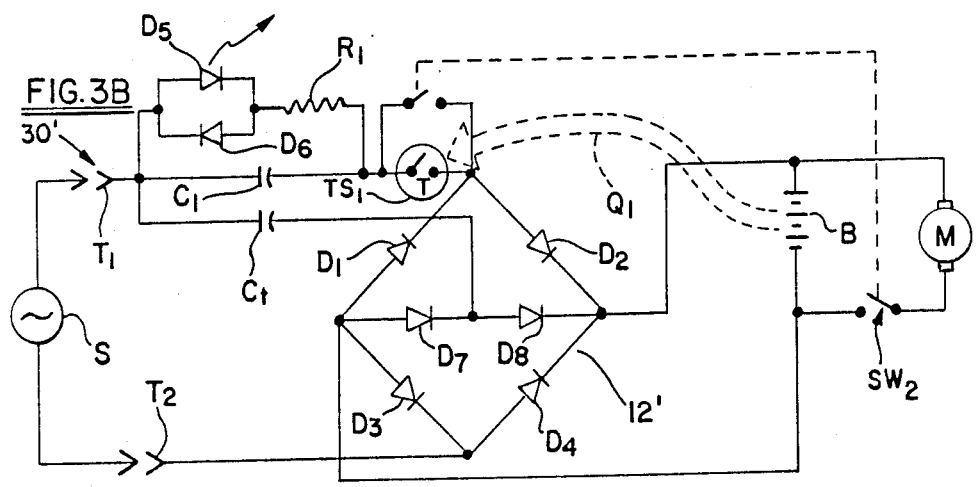
FIG. 3B is a schematic diagram of a variation of the battery charger circuit of FIG. 3A.

A variation of the battery charger 30 of FIG. 3A is shown in FIG. 3B and designated therein by the reference character 30′. As shown, the thermostat $TS_1$ is placed in series circuit between the capacitor $C_1$ and the connection between the diodes $D_1$ and $D_2$ of the diode bridge 12′. The circuit variation 30′ operates in a manner analogous to the circuit 30 of FIG. 3A, that is, the full or fast charge current is provided through the capacitor $C_1$ and the thermostat $TS_1$ to the diode bridge 12′ until the battery B attains full charge and the thermostat $TS_1$ is opened with a trickle or maintenance current provided through the capacitor $C_t$.

Figure 4:
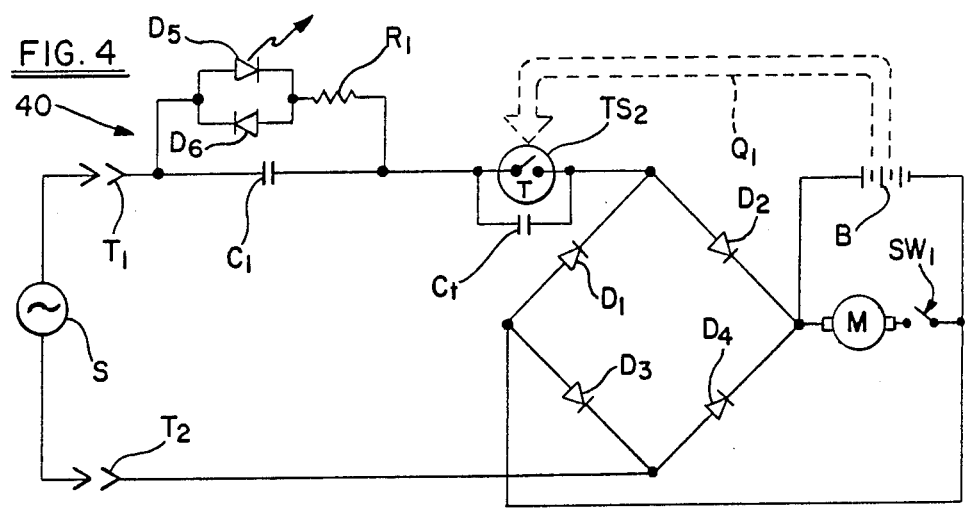
FIG 4 is a schematic diagram of a variation of the battery charger circuits of FIGS. 2 and 3A illustrating another circuit by which first and second charging current levels can be provided to a battery.

A variation of the battery charger circuits 30 and 30′ of FIGS. 3A and 3B is shown in FIG. 4 and designated generally by the reference character 40. As shown, the thermostat $TS_1$ is placed in series in the AC portion of the circuit between the terminal $T_1$ and the diode bridge 12. When the temperature of the battery B exceeds the threshold of the thermostat $TS_1$, the thermostat is opened to thus interrupt the charging current applied to the battery B. A capacitor $C_t$ is provided in parallel circuit with the thermostat $TS_1$ and functions in a manner analogous to the resistor $R_t$ of the embodiment of FIG. 2 to provide an AC current path around the opened thermostat $TS_1$ and thus provide a constant trickle current flow to the battery B when the thermostat $TS_1$ is open.

Figure 5:
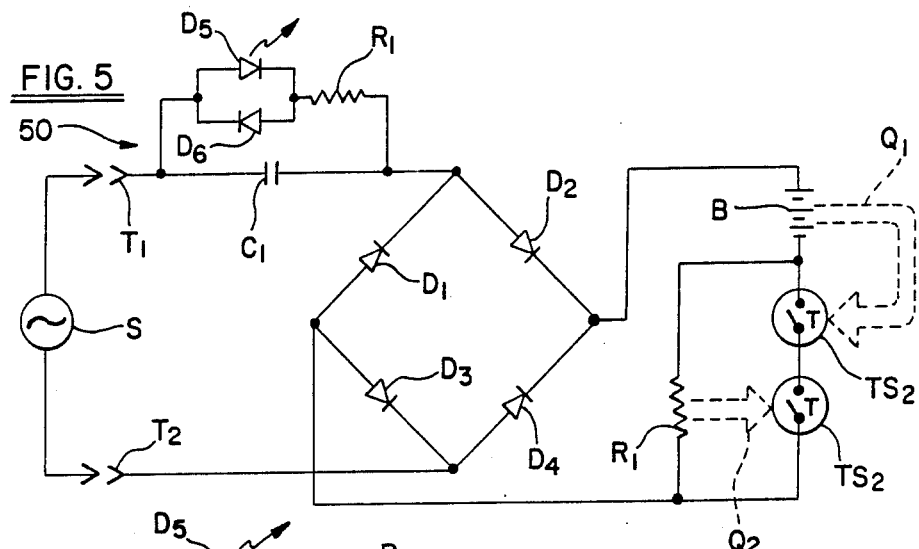
FIG. 5 schematic diagram of a battery charger circuit in which the charging current is latched off after the battery achieves full charge.

In the above-described circuit embodiments, the thermostat $TS_1$ operates in response to battery B temperature, that is, as the battery B attains full charge and its temperature rises, the thermostat $TS_1$ opens and remains in a latched-open state until it is reset by the user. A battery charger having a latch-open thermostat arrangement that automatically resets after the charger is disconnected from the power source S is shown in FIG. 5 and designated therein generally by the reference character 50 with components in common with those described above represented by the same reference character. As shown, the power source S provides electrical energy via terminals $T_1$ and $T_2$ and the capacitor $C_1$ to the diode bridge 12. The battery B is in series circuit a thermostat $TS_1'$ and another serially connected thermostat $TS_2$ across the output of the diode bridge 12. In contrast to the thermostat $TS_1$, the thermostats $TS_1'$ and $TS_2$ are of the non-latching type, that is, they open and close in response to changing temperature. A trickle resistor $R_t$ is connected in parallel across the series-connected thermostats $TS_1'$ and $TS_2$. As indicated in dotted line illustration, the thermostat $TS_1'$ is in thermal communication with the battery B via heat conduction path $Q_1$ while the resistor $R_t$ is in thermal communication with the thermostat $TS_2$ along heat conduction path $Q_2$. In operation, the thermostat $TS_1'$ functions in the manner described above to interrupt the flow of charging current to the battery B when the temperature of the fully charged battery B rises above the preselected threshold of the thermostat $TS_1'$, e.g., 45°–50° C. When the thermostat $TS_1'$ opens, a trickle current flow is established through the resistor $R_t$ which then undergoes Joule heating and, when its temperature rises to a preselected threshold value, typically 45°–50° C., the thermostat $TS_2$ opens. In this circuit configuration, the thermostat $TS_1'$ can then reclose once the temperature of the now fully charged battery B falls below the preselected threshold temperature, e.g., 40°–44° C. However, the current flow through the resistor $R_t$ and the associated Joule heating will keep the thermostat $TS_2$ open to effectively prevent resumption of the charging current flow through the battery B. The circuit will remain in this 'latched' state indefinitely and can be only reinitialized by removing the battery B from the battery charger 50 or disconnecting the power source S and allowing the resistor $R_t$ to cool and the thermostat $TS_2$ to reset. As can be appreciated, the battery charger 50 eliminates unnecessary cycling of the charging current applied to the battery B and can be left in its trickle charge mode indefinitely.

Figure 6:
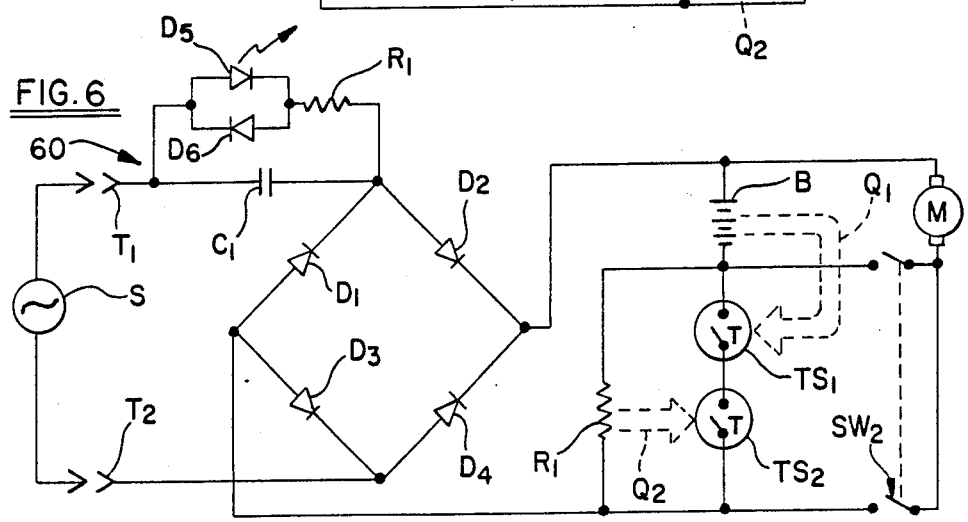
FIG. 6 is a schematic diagram of a variation of the battery charger circuit of FIG. 5.

A variation of the latching thermostat configuration of FIG. 5 is shown in FIG. 6 and designated therein by the reference character 60 with components in common with those of FIG. 2 are designated by the same reference character. As shown, thermostats $TS_1'$ and $TS_2$ are serially connected with the battery B across the diode bridge 12 with one pole of the double-pole single-throw ON-OFF switch $SW_2$ connected between the battery B and the motor M and the other pole connected to the common current path with the diode bridge 12. The thermostats $TS_1'$ and $TS_2$ operate in the manner described above to provide a full charge current to the battery B and to latch open when the temperature of the fully charged battery B rises above the threshold of thermostat $TS_1'$. When the ON-OFF switch $SW_2$ is closed, electrical energy from the battery B and supplemental electrical energy from the power source S is used to power the motor M with the proportionate energy contribution from the battery B and the charger circuit as described above to allow a longer operating period before the battery B discharges.

The present invention advantageously provides a compact battery charger that is inexpensive to fabricate because of its non-isolated configuration and yet provides for the efficient charging of batteries including both full charge and trickle charge operating states and which also provides a latching feature by which the charging circuit is latched into the trickle charge operating state after the attainment of a full charge.

Thus it will be appreciated from the above that as a result of the present invention, a highly effective non-isolated thermally responsive battery charger is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A non-isolated temperature-responsive battery charger circuit, comprising:
   a diode bridge circuit for accepting an AC input current and for providing a rectified full charging current at a level for charging a battery;
   capacitive impedance means in circuit with said diode bridge circuit for connection therewith to a source of AC input current for coupling the AC input current to said diode bridge circuit and for establishing the level of full charging current for charging the battery;
   a battery charging circuit path connected to said diode bridge circuit and to the battery for providing the charging current to the battery at the level for charging the battery;
   temperature responsive means in thermal communication with the battery to sense the temperature thereof while being charged, and for allowing full charging current at the established level to be passed to the battery from said diode bridge circuit;
   said temperature responsive means responding to the temperature of the battery during charging to interrupt or cause reduction of said full charging current to the battery when the temperature of the battery exceeds a predetermined threshold value representative of the battery having been substantially fully charged; and
   switch means, in circuit with the battery and said temperature responsive means, arranged for providing electrical power to a connected load from the battery supplemented by a smaller contribution of electrical power provided by the rectified current at the established level for charging the battery as supplied from said diode bridge circuit.

2. The battery charger circuit as set forth in claim 1, which comprises impedance means, in parallel circuit with said temperature responsive means, for providing a trickle charging current path to the battery when said temperature responsive means responds to the temperature of the battery exceeding said threshold value.

3. The battery charger circuit as set forth in claim 2, wherein said impedance means comprises a resistor.

4. The battery charger as set forth in claim 1 wherein the switch means comprises double pole switch means for disconnecting the battery from a load when said switch means is open, and for shunting said temperature responsive means and connecting both the battery and said capacitive impedance means to said load when said switch means is closed.

5. The battery charger as set forth in claim 1, wherein said switch means comprises a first contact connected to one side of said temperature responsive means and a second contact connected to the other side of said temperature responsive means, and first and second electrically connected poles for respective engagement with said first and second contacts.

6. A non-isolated temperature-responsive battery charger circuit, comprising:
   a diode bridge circuit for accepting an AC input current and for providing a rectified charging current;
   capacitive impedance means in circuit with said diode bridge circuit for direct connection to a source of AC input current for coupling the AC input current to said diode bridge circuit;
   a battery charging circuit path connected to said diode bridge circuit for providing the charging current to a battery connected in said charging circuit path;
   first and second serially connected temperature responsive means electrically connected in said charging circuit path to pass charging current as determined by said capacitive impedance means to the battery being charged when said first and second temperature responsive means are in a closed state;
   resistive impedance means in parallel circuit with said first and second serially connected temperature responsive means, for conducting current when at least one of said first or second temperature responsive means is open to effect trickle charging of the battery;
   said first temperature responsive means being in thermal communication with the battery being charged to sense the temperature of the battery, and said second temperature responsive means being in thermal communication with said resistive impedance means to sense the temperature of said resistive impedance means;
   said first temperature responsive means responding to the temperature of the battery to interrupt the flow of charging current to the battery through said first temperature responsive means when the temperature of the battery exceeds a predetermined threshold value representative of a substantial full charge and to cause trickle charging current flow through said resistive means; and
   said second temperature responsive means responding to the temperature of said resistive impedance means to interrupt the circuit to said first temperature responsive means when the temperature of said resistive means exceeds a predetermined threshold value.

7. A non-isolated temperature-responsive battery charger circuit, comprising:
   a diode bridge circuit for accepting an AC input current and for providing a rectified charging current;
   capacitive impedance means in circuit with said diode bridge circuit for connection therewith to a source of AC input current for coupling the AC input current to said diode bridge circuit;
   a battery charging circuit path connected to said diode bridge circuit for providing the charging current to a battery connected in said charging circuit path;
   temperature responsive means in thermal communication with the battery to sense the temperature thereof while being charged, and for allowing charging current to be passed to the battery from said diode bridge circuit;
   said temperature responsive means responding to the temperature of the battery during charging to interrupt or cause reduction of said full charging current to the battery when the temperature of the battery exceeds a predetermined threshold value representative of the battery having been substantially fully charged;
   switch means, in circuit with the battery and said temperature responsive means, for providing electrical power from the battery and said diode bridge circuit to a connected load; and
   circuit means connected in parallel circuit with said capacitive impedance means for discharging said capacitive impedance means wherein said circuit means comprises parallel connected back-to-back diodes in series circuit with a resister.

8. The battery charger circuit as set forth in claim 7, wherein at least one of said parallel connected diodes is a light emitting diode.

9. A non-isolated temperature-responsive battery charger circuit, comprising:
- a diode bridge circuit for accepting an AC input current and for providing a rectified charging current;
- capacitive impedance means in circuit with said diode bridge circuit for connection therewith to a source of AC input current for coupling the AC input current to said diode bridge circuit;
- a battery charging circuit path connected to said diode bridge circuit for providing the charging current to a battery connected in said charging circuit path;
- temperature responsive means in thermal communication with the battery to sense the temperature thereof while being charged, and for allowing charging current to be passed to the battery from said diode bridge circuit;
- said temperature responsive means responding to the temperature of the battery during charging to interrupt or cause reduction of said full charging current to the battery when the temperature of the battery exceeds a predetermined threshold value representative of the battery having been substantially fully charged;
- switch means, in circuit with the battery and said temperature responsive means, for providing electrical power from the battery and said diode bridge circuit to a connected load;
- a resistor, in parallel circuit with said temperature responsive means, for providing a trickle charging current path to the battery when said temperature responsive means responds to the temperature of the battery exceeding said threshold value; and
- an auxiliary temperature responsive means connected in series with said temperature responsive means, said resister being in parallel to and in thermal communication with said auxiliary temperature responsive means, said auxiliary temperature responsive means responding to the temperature of said resistor to interrupt charging current to the battery via said temperature responsive means while trickle charging of the battery proceeds via said resistor.

10. The battery charger as set forth in claim 9, wherein said impedance means comprises a second capacitive means.

11. The battery charger as set forth in claim 10, wherein said second capacitive means is connected between said source of AC input current and a diagonal of said diode bridge circuit.

12. A non-isolated temperature-responsive battery charger circuit, comprising:
- a diode bridge circuit for accepting an AC input current and for providing a rectified charging current;
- capacitive impedance means in circuit with said diode bridge circuit for connection therewith to a source of AC input current for coupling the AC input current to said diode bridge circuit;
- a battery charging circuit path connected to said diode bridge circuit for providing the charging current to a battery connected in said charging circuit path;
- temperature responsive means in thermal communication with the battery to sense the temperature thereof while being charged, and for allowing charging current to be passed to the battery from said diode bridge circuit;
- said temperature responsive means responding to the temperature of the battery during charging to interrupt or cause reduction of said full charging current to the battery when the temperature of the battery exceeds a predetermined threshold value representative of the battery having been substantially fully charged;
- said capacitive impedance means, said temperature responsive means, and said diode bridge circuit being connected in series circuit; and
- switch means, in circuit with the battery and said temperature responsive means, for providing electrical power from the battery and said diode bridge circuit to a connected load.

13. A non-isolated temperature-responsive battery charger circuit, comprising:
- a diode bridge circuit for accepting an AC input current and for providing a rectified charging current;
- capacitive impedance means in circuit with said diode bridge circuit for connection therewith to a source of AC input current for coupling the AC input current to said diode bridge circuit;
- a battery charging circuit path connected to said diode bridge circuit for providing the charging current to a battery connected in said charging circuit path;
- temperature responsive means connected in a leg of said diode bridge circuit and in thermal communication with the battery to sense the temperature thereof while being charged, and or allowing charging current to be passed to the battery from said diode bridge circuit;
- said temperature responsive means responding to the temperature of the battery during charging to interrupt or cause reduction of said full charging current to the battery when the temperature of the battery exceeds a predetermined threshold value representative of the battery having been substantially fully charged; and
- switch means, in circuit with the battery and said temperature responsive means, for providing electrical power from the battery and said diode bridge circuit to a connected load.

* * * * *